US011238556B2

(12) United States Patent
Filler et al.

(10) Patent No.: US 11,238,556 B2
(45) Date of Patent: Feb. 1, 2022

(54) EMBEDDING SIGNALS IN A RASTER IMAGE PROCESSOR

(71) Applicant: Digimarc Corporation, Beaverton, OR (US)

(72) Inventors: Tomas Filler, Tigard, OR (US); Alastair M. Reed, Lake Oswego, OR (US); John F. Stach, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/455,622

(22) Filed: Jun. 27, 2019

(65) Prior Publication Data

US 2020/0160481 A1    May 21, 2020

Related U.S. Application Data

(63) Continuation of application No. 15/621,843, filed on Jun. 13, 2017, now abandoned, which is a continuation of application No. 13/789,126, filed on Mar. 7, 2013, now Pat. No. 9,684,941.

(60) Provisional application No. 61/719,920, filed on Oct. 29, 2012.

(51) Int. Cl.
*G06T 1/00* (2006.01)
*G06T 7/73* (2017.01)
*G06T 7/246* (2017.01)

(52) U.S. Cl.
CPC ............ *G06T 1/0064* (2013.01); *G06T 7/246* (2017.01); *G06T 7/73* (2017.01);
(Continued)

(58) Field of Classification Search
CPC ....... G06T 1/0021; G06T 1/0064; G06T 7/73; G06T 7/246; G06T 2201/0065; G06T 2207/10016; G06T 2207/30244
See application file for complete search history.

(56) References Cited

U.S. PATENT DOCUMENTS 5,946,414 A * 8/1999 Cass .................... G06T 1/0021
382/183
6,122,403 A    9/2000 Rhoads
(Continued)

OTHER PUBLICATIONS

Azuma, 'A Survey of Augmented Reality,' Presence: Teleoperators and Virtual Environments 6, 4, Aug. 1997, pp. 355-385.
(Continued)

*Primary Examiner* — Nay A Maung
*Assistant Examiner* — Jose M Torres
(74) *Attorney, Agent, or Firm* — Digimarc Corporation

(57) ABSTRACT

Image processing technology embeds signal (e.g., digital watermarks) within imagery during a raster image process (or). One claim recites: an image processing method of embedding a signal within imagery using raster image processing (RIP), including: obtaining a plurality of elements representing a signal; determining edges within the imagery; using the determined edges as a reference, modulating a plurality of print structures within the RIP according to the plurality of elements to embed the signal within the imagery, in which one determined edge defines the signal to be at a predetermined angle in a set of dimensions comprising color and spatial frequency. Of course, other claims, combinations and technology are described too.

10 Claims, 5 Drawing Sheets

(52) U.S. Cl.
CPC ........... *G06T 2201/0065* (2013.01); *G06T 2207/10016* (2013.01); *G06T 2207/30244* (2013.01)

(56) References Cited

U.S. PATENT DOCUMENTS

| | | |
|---|---|---|
| 6,590,996 B1 | 7/2003 | Reed |
| 6,614,914 B1 | 9/2003 | Rhoads |
| 6,694,041 B1 | 2/2004 | Brunk |
| 6,700,995 B2 | 3/2004 | Reed |
| 6,711,293 B1 | 3/2004 | Lowe |
| 6,760,464 B2 | 7/2004 | Brunk |
| 7,116,781 B2 | 10/2006 | Rhoads |
| 7,289,643 B2 | 10/2007 | Brunk |
| 7,359,526 B2 | 4/2008 | Nister |
| 7,443,537 B2 | 10/2008 | Reed |
| 7,616,807 B2 | 11/2009 | Zhang |
| 7,715,446 B2 | 5/2010 | Rhoads |
| 7,761,326 B2 | 7/2010 | Miyaoku |
| 8,107,721 B2 | 1/2012 | Beardsley |
| 8,243,980 B2 | 8/2012 | Rhoads |
| 8,565,815 B2 | 10/2013 | Rhoads |
| 8,762,852 B2 | 6/2014 | Davis |
| 8,831,279 B2 | 9/2014 | Rodriguez |
| 8,855,712 B2 | 10/2014 | Lord |
| 8,886,222 B1 | 11/2014 | Rodriguez |
| 9,008,353 B2 | 4/2015 | Aller |
| 9,269,022 B2 | 2/2016 | Rhoads |
| 9,398,210 B2 | 7/2016 | Stach |
| 2001/0040979 A1 | 11/2001 | Davidson |
| 2002/0191812 A1* | 12/2002 | Kim ............... G06T 1/0028 382/100 |
| 2003/0012410 A1 | 1/2003 | Navab |
| 2003/0030271 A1* | 2/2003 | Wicker ............ B42D 25/405 283/113 |
| 2003/0128861 A1* | 7/2003 | Rhoads ............ G06F 21/00 382/100 |
| 2003/0210803 A1* | 11/2003 | Kaneda ........... H04N 1/32203 382/100 |
| 2004/0128512 A1 | 7/2004 | Sharma |
| 2006/0031684 A1 | 2/2006 | Sharma |
| 2006/0280246 A1 | 12/2006 | Alattar |
| 2007/0035562 A1 | 2/2007 | Azuma |
| 2007/0079124 A1* | 4/2007 | Maeno ............ H04N 1/32203 713/176 |
| 2007/0300071 A1 | 12/2007 | Kesal |
| 2008/0048433 A1* | 2/2008 | Wicker ........... H04N 1/32144 283/94 |
| 2008/0174570 A1 | 7/2008 | Jobs |
| 2008/0252727 A1 | 10/2008 | Brown |
| 2010/0128321 A1* | 5/2010 | Wang ............. H04N 1/4058 358/3.28 |
| 2010/0232727 A1 | 9/2010 | Engedal |
| 2010/0322469 A1 | 12/2010 | Sharma |
| 2012/0154633 A1 | 6/2012 | Rodriguez |
| 2012/0210233 A1 | 8/2012 | Davis |
| 2012/0300979 A1 | 11/2012 | Pirchheim |
| 2014/0028850 A1 | 1/2014 | Keating |
| 2014/0037137 A1* | 2/2014 | Broaddus .......... G06T 7/248 382/103 |
| 2014/0044304 A1 | 2/2014 | Rhoads |
| 2014/0071268 A1 | 3/2014 | Lord |
| 2014/0112524 A1 | 4/2014 | Bai |
| 2014/0375810 A1 | 12/2014 | Rodriguez |
| 2016/0189381 A1 | 6/2016 | Rhoads |

OTHER PUBLICATIONS

Bay et al., SURF: Speeded up Robust Features, Eur. Conf. on Computer Vision (1), pp. 404-417, 2006.

Benhimane et al., "Homography-based 2D visual tracking and servoing," The International Journal of Robotics Research, vol. 26, No. 7, pp. 661-676, Jul. 2007.

Bonato et al., 'Parallel Hardware Architecture for Scale and Rotation Invariant Feature Detection,' IEEE Trans on Circuits and Systems for Video Tech, vol. 18, No. 12, 2008. 11 pages.

Chen et al., 'Efficient Extraction of Robust Image Features on Mobile Devices,' Proc. of the 6th IEEE and ACM Int. Symp. on Mixed and Augmented Reality, 2007. (2 pages).

David Lowe, 'Object Recognition from Local Scale-Invariant Features,' International Conference on Computer Vision, Corfu, Greece (Sep. 1999), pp. 1150-1157.

Gene, 'Marker-less Tracking for AR: A Learning-Based Approach,' Proc. 1st IEEE/ACM Int. Symp. on Mixed and Augmented Reality, Aug. 2002, pp. 295-304.

Kato et al., "Marker Tracking and HMD Calibration for a Video-Based Augmented Reality Conferencing System," Proc. of IWAR '99, San Francisco, CA, Oct. 20-21, 1999, pp. 85-94.

Klein, et al., 'Parallel Tracking and Mapping on a camera phone,' Mixed and Augmented Reality, ISMAR 2009, 8th IEEE International Symposium on Oct. 19-22, 2009. pp. 83-86.

Koz, "Watermarking for 3D Representations," A Thesis Submitted to the Graduate School of Natural and Applied Sciences of Middle East Technical University, Aug. 2007. 169 pages.

Lepetit et al. (Oct. 2003) "Fully Automated and Stable Registration for Augmented Reality Applications." Proc. 2.sup.nd IEEE/ACM Int'l Symposium on Mixed and Augmented Reality, pp. 93-102.

Lowe, Distinctive image features from scale-invariant keypoints, International Journal of Computer Vision, 60, 2 (2004), pp. 91-110.

Mikolajczyk et al., 'A Performance Evaluation of Local Descriptors,' IEEE Trans. Pattern Anal. Mach. Intell., vol. 27, No. 10, pp. 1615-1630, 2005.

Paucher et al., 'Location-Based Augmented Reality on Mobile Phones,' IEEE Conf. on Computer Vision and Pattern Recognition, Jun. 13, 2010, pp. 9-16.

Pirchheim et al., 'Homography-Based Planar Mapping and Tracking for Mobile Phones', IEEE International Symposium on Mixed and Augmented Reality 2011, Oct. 26-29, 2001, pp. 27-36.

Reitmayr, 'Going Out: Robust Model-based Tracking for Outdoor Augmented Reality,' Proc. 5.sup.th IEEE/ACM Int. Symp. on Mixed and Augmented Reality, 2006, pp. 109-118.

Rekimoto, Matrix: A Realtime Object Identification and Registration Method for Augmented Reality, Proc. of Asia Pacific Computer Human Interaction, pp. 63-68, Jul. 1998.

Rohs, 'Using Camera-Equipped Mobile Phones for Interacting with Real-World Objects,' Advances in Pervasive Computing, 2004. 7 pages.

Ruiz, P. E. Lopez de Teruel, and L. Fernandez. Practical planar metric rectification, In Proc. BMVC 2006. 10 pages.

Se et al., "Vision Based Modeling and Localization for Planetary Exploration Rovers," Proc. of Int. Astronautical Congress (IAC), Oct. 2004. 11 pages.

Shi et al. (Jun. 1994) "Good features to track." Proc. 1994 IEEE Comp. Sci. Soc. Conf. on Computer Vision and Pattern Recognition (CVPR 1994), pp. 593-600.

Skrypnyk, Iryna et al. "Scene Modelling, Recognition and Tracking with Invariant Image Features," 2004, Proceedings of the Third IEEE and ACM International Symposium on Mixed and Augmented Reality, 10 pages.

Takacs, et al., Outdoors augmented reality on mobile phone using loxel-based visual feature organization, Proc. 1st ACM Int'l Conf on Multimedia Information Retrieval, 2008. (8 pages).

U.S. Appl. No. 61/719,920, filed Oct. 29, 2012.

U.S. Appl. No. 61/749,767, filed Jan. 7, 2013.

Wang, S.; Wu, A. Y.; Rosenfeld, A., in IEEE Transactions on Pattern Analysis and Machine Intelligence, vol. PAMI-3, Nov. 1981, p. 687-696.

* cited by examiner

FIG. 6
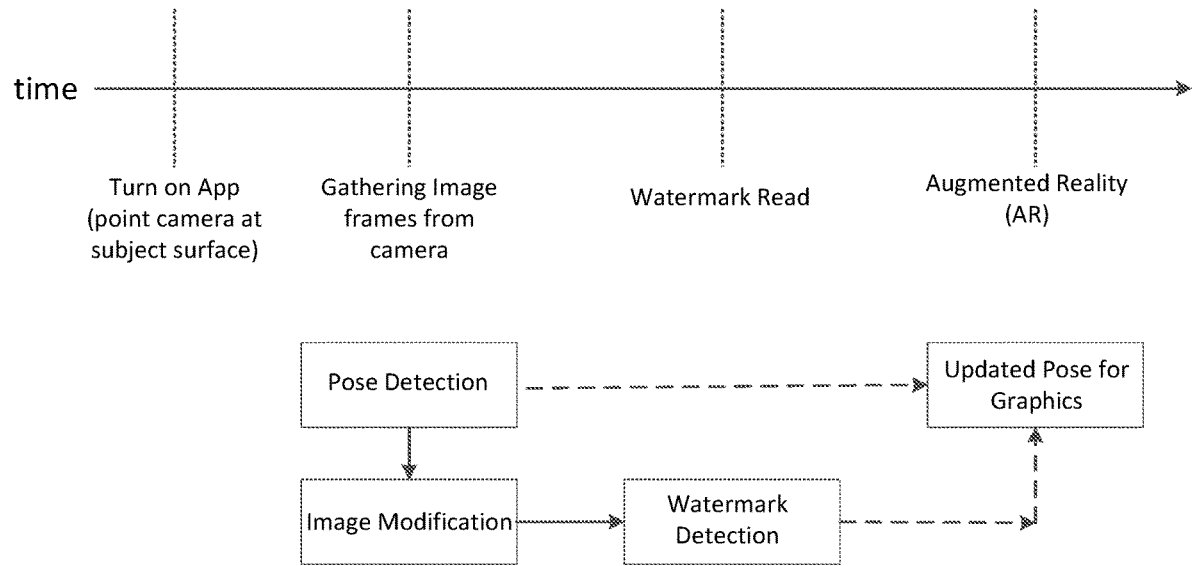
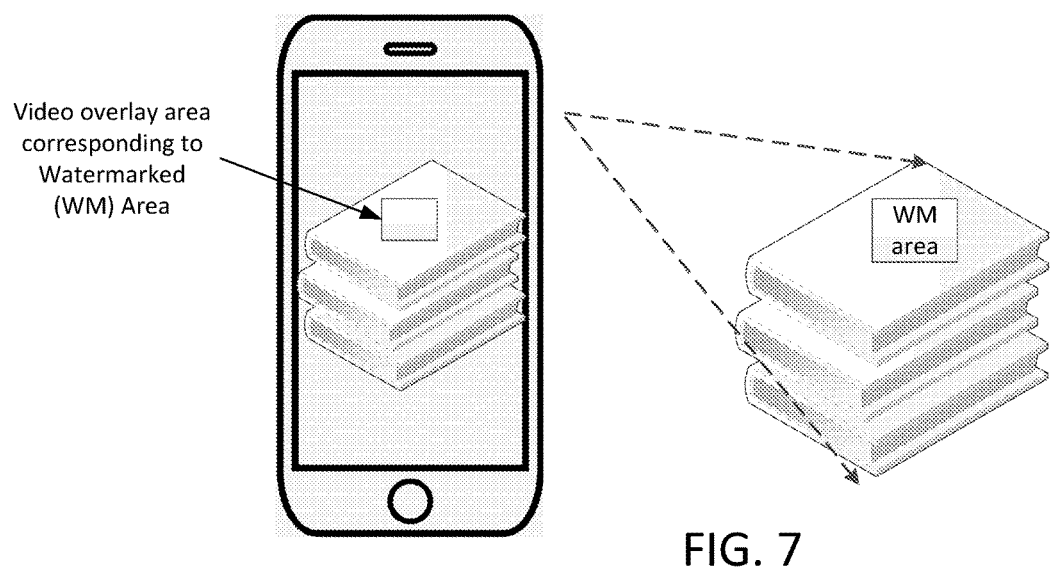
FIG. 7

EMBEDDING SIGNALS IN A RASTER IMAGE PROCESSOR

APPLICATION FIELD

This application is a continuation of U.S. application Ser. No. 15/621,843, filed Jun. 13, 2017 (U.S. Publication No. US 2018-01310170 A1), which is a continuation of U.S. application Ser. No. 13/789,126, filed Mar. 7, 2013 (U.S. Pat. No. 9,684,941), which claims the benefit of U.S. Provisional Patent Application No. 61/719,920, filed Oct. 29, 2012. This application is also related to U.S. Provisional Patent Application No. 61/749,767, filed Jan. 7, 2013. Each of the above patent documents is hereby incorporated herein by reference in its entirety.

TECHNICAL FIELD

This disclosure relates to digital signal processing, image rendering (including Raster Image Processing for print), image recognition, data signal detection, and computer generated graphics in conjunction with live image capture and recognition (e.g., Augmented Reality).

BACKGROUND AND SUMMARY

There are a variety of ways to encode machine readable information on objects, and in particular, on printed objects. Conventional visible data carriers for printed media include various forms of bar codes, including monochrome (e.g., black and white) 1D and 2D bar codes, as well as newer higher density codes that use additional colors to carry data. One example of higher density bar codes are data glyphs, which are marks (e.g., forward and back slash marks) printed at higher resolution. When viewed from a distance, glyph codes can appear as a uniform tone, and as such, can be printed in the background around other visual information.

In these types of data carriers, the elementary units (bars or data glyph marks) are independent of other visual information and convey auxiliary data. A mark or arrangement of marks is a pattern that corresponds to an auxiliary data symbol. To read the data from a printed object, the object is first optically scanned with an image sensor, converting light to an electronic signal. The electronic signal is then analyzed to detect the elements of the mark and convert them to data.

Digital watermarking is a machine readable code in which the data is hidden within an image leveraging human visibility models to minimize visual impact on the image. For certain types of applications where image information is sparse, the auxiliary data signal can still be applied to the printed object with minimal visual impact by inserting imperceptible structures having spatial frequency and color beyond the range of human visual perception. The auxiliary data signal can be conveyed by printing ink structures or modifying existing structures with changes that are too small to see or use colors that are difficult to discern. As such, digital watermarking techniques provide the flexibility of hiding data within image content, as well as inserting data in parts of a printed object where there is little or no other visual information.

These types of visible and hidden data carriers are useful for applications where there is a need to convey variable digital data in the printed object. Hidden data carriers increase the capacity of printed media to convey visual and machine readable information in the same area. Even printed objects, or portions of objects (such as logos, pictures or graphics on a document or package) that appear identical are transformed into variable data carriers.

For some applications, it is possible to identify an image using a one-to-many pattern matching scheme. Images to be uniquely identified are enrolled in a reference database, along with metadata. In image fingerprinting schemes, image features are stored in the reference database. Then, to recognize an image, suspect images, or its features, are matched with corresponding images or features in the reference database. Once matched, the reference database can provide associated digital data stored with the image.

Data carrying signals and matching schemes may be used together to leverage the advantages of both. In particular, for applications where maintaining the aesthetic value or the information content of the image is important, a combination of digital watermarking and image fingerprinting can be used.

Combinations of watermarks and fingerprints for content identification and related applications are described in assignees U.S. Patent Publications 20060031684 and 20100322469, which are each hereby incorporated by reference in its entirety. Watermarking, fingerprinting and content recognition technologies are also described in assignee's U.S. Patent Publication 20060280246 and U.S. Pat. Nos. 6,122,403, 7,289,643, 6,614,914, and 6,590,996 which are each hereby incorporated by reference in its entirety.

In many applications, it is advantageous to insert auxiliary data in printed object in a way that does not impact the other visual information on the object, yet still enables the data to be reliably retrieved from an image captured of the object. To achieve this, a technique to exploit the gap between the limit of human visual perception and the limit of an image sensor has been developed. The gamut of human visual perception and the gamut of an image sensor are defined in terms of characteristics of the rendered output, including spatial resolution or spatial frequency and color. Each gamut is a multi-dimensional space expressed in terms of these characteristics. The gap between the gamut of human and sensor perception is a multidimensional space that our data insertion schemes exploit to insert auxiliary data without impacting other visual information on the object.

This multi-dimensional gap is a 5-dimensional space (2 spatial+3 color) or higher (spatial/color shapes, frequencies, distributions) where our methods insert:

(1) uniform texture watermarks (independent of content—but controlled for visibility), and (2) content-based watermarks where the content is used as a reference framework.

As a reference, the content is either altered in a measureable but imperceptible way or used (e.g., edges) to locate and orient an underlying variation that is intended to keep the content unchanged.

Digital printing is becoming increasingly more advanced, enabling greater flexibility and control over the image characteristics used for data insertion when preparing an image for printing. The process of preparing a digital image for printing encompasses conversion of an image by a Raster Image Processor, Raster Image Processing, halftoning, and other pre-print image processing. Background on these processes is provided below.

Along with advances in printing, the gamut of even widely used image sensors is becoming greater. For hidden data insertion, the challenge is to insert the data in the human-sensor perception gap so that it can be widely detected across many consumer devices. Of course, for certain security applications, more expensive printers and image scanners can be designed to insert security features and expand the gamut of the scanning equipment used to detect such features. This is useful to detect security features and/or tampering with such features. However, the human-device perception gap is smaller for more widely deployed sensors, such as those commonly used in mobile devices like smart phones and tablet PCs.

Our data insertion methods exploit the gap more effectively through data insertion in the process of preparing a digital image for printing. Additional control over the process of inserting auxiliary data is achieved by implementing the process in the Raster Image Processor (RIP).

A raster image processor (RIP) is a component used in a printing system which produces a raster image also known as a bitmap. The bitmap is then sent to a printing device for output. The input may be a page description in a high-level page description language such as PostScript, Portable Document Format, XPS or another bitmap of higher or lower resolution than the output device. In the latter case, the RIP applies either smoothing or interpolation algorithms to the input bitmap to generate the output bitmap.

Raster image processing is the process and the means of turning vector digital information such as a PostScript file into a high-resolution raster image. A RIP can be implemented either as a software component of an operating system or as a firmware program executed on a microprocessor inside a printer, though for high-end typesetting, standalone hardware RIPs are sometimes used. Ghostscript and GhostPCL are examples of software RIPs. Every PostScript printer contains a RIP in its firmware.

Half-toning is a process of converting an input image into halftone structures used to apply ink to a medium. The digital representation of a halftone image is sometimes referred to as a binary image or bitmap, as each elementary image unit or pixel in the image corresponds to the presence, or not, of ink. Of course, there are more variables that can be controlled at particular spatial location, such as various color components (CMYK and spot colors). Some advanced printers can control other attributes of the ink placement, such as its density or spatial depth or height.

This half-toning process is typically considered to be part of the RIP or Raster Image Processing. In some printing technologies, these halftone structures take the form of clustered dots (clustered dot half-toning). In others, the halftone structures take the form of noise-like dot patterns (e.g., stochastic screens, blue noise masks, etc.).

Our patent literature provides several techniques for digital watermarking in the halftone process. Examples of these techniques are detailed in U.S. Pat. Nos. 6,694,041 and 6,760,464, which are each hereby incorporated herein by reference in its entirety.

New printing techniques enable very fine structures to be created in the RIP which will appear visually identical to the eye. For example a 50% gray can be created with a conventional clustered dot screen pattern at 150 lines per inch, or exactly the same visual effect can be created with a much higher frequency line structure such as a stochastic screen. Usually, these two structures are not mixed on one page, as they have very different dot gain characteristics and require different corrections. However, our methods are able to correct for the mechanical dot gain, so that the two patterns appear identical when they appear on the same page. See, in particular, our prior work in dot gain correction, printer calibration, and compensating for printer and scanner effects, in U.S. Pat. Nos. 6,700,995, 7,443,537, and U.S. Patent Publication 20010040979, which are each hereby incorporated herein by reference in its entirety.

Mobile devices have a capture resolution of much greater than 150 lpi (resolution of newer phones, such as iPhone 4 is about 600 lpi or better), so they can be used to distinguish between these two types of patterns. One particular example is an image that appears as a uniform texture, yet a watermark pattern is inserted into it by modulating the line screen frequency and direction according to a watermark signal pattern. In particular, the locations of a watermark pattern are printed using a higher frequency line pattern at first direction (e.g., vertical screen angle). The other locations are printed with a lower frequency line pattern in another direction (e.g., diagonal screen angle). The watermark signal is modulated into the image by selection of a higher frequency screen at an arrangement of spatial locations that form the watermark signal pattern. When printed, these locations look similar to surrounding locations. However, when scanned, the sensor sees these locations as being different, and the watermark pattern in the resulting electronic image is easier to detect.

This approach allows a whole set of new messaging techniques to be used in the range between 150 lpi and 600 lpi where 2 spatial dimensions and 3 dimensions of color information can be inserted. This information can be watermark, barcode or any other signaling mechanism.

BRIEF DESCRIPTION OF THE DRAWINGS

FIG. 6 is a timeline associated with resolving pose information to aid digital watermark detection.

FIG. 7 is a diagram of an Augmented Reality system providing a video overlay in a device display that corresponds to a watermarked area on a subject surface.

DETAILED DESCRIPTION

Figure 1:
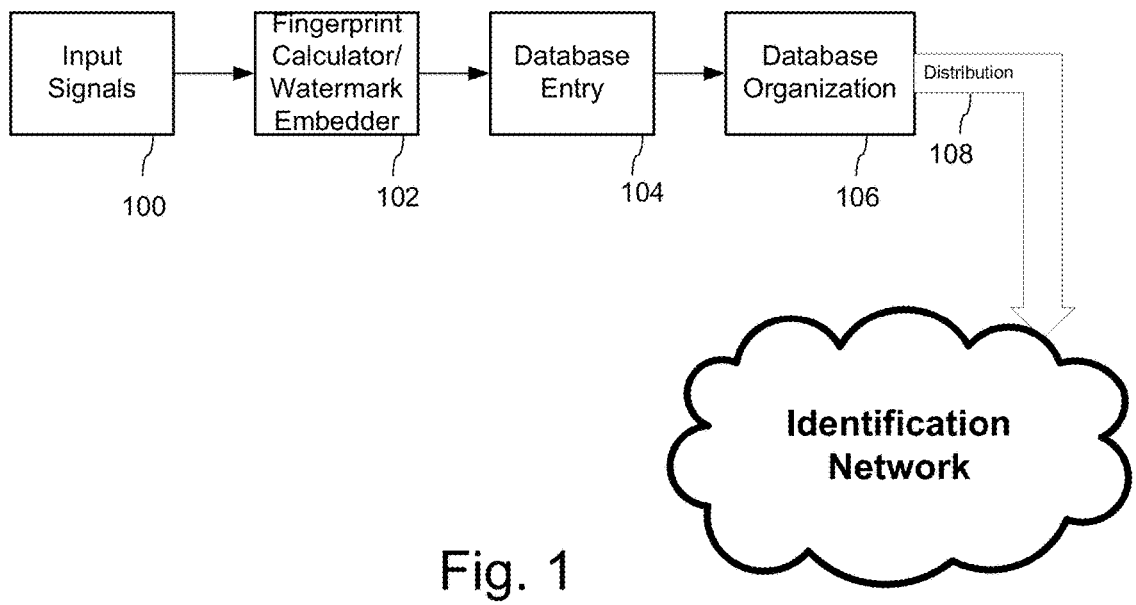
FIG. 1 is a block diagram illustrating the creation of a content recognition system using fingerprints and watermarks.

The process of digital watermark insertion includes generating a watermark signal, and then using that signal to modulate characteristics of the image in the human-sensor gap. As described above, this process is preferably conducted at the RIP stage to enable control over the image representation used to control application of ink to a print media.

In prior work, several methods for generating the watermark signal, and for detecting the watermark signal in images captured of printed objects, are detailed. Please see U.S. Pat. Nos. 6,614,914 and 6,590,996, which are incorporated by reference. Therefore, for this discussion, the focus is on techniques used within the RIP to insert the watermark signal.

In one implementation, the watermark signal is generated as an array of watermark signal elements. These elements are mapped to spatial locations within an image block, called a tile. This tile is then replicated (e.g., tiled in a regular, contiguous array of blocks in two dimensions) across the area of the host image in which the watermark signal is to be inserted. At a spatial location where there is image content in the host image, the watermark signal element is used to modify the host image content at that location to carry the watermark signal element, subject to constraints set for perceptual masking. These constraints enable the watermark signal to be increased or decreased (possibly to zero), depending on perceptual masking, and desired watermark signal strength. Conversely, where there is no image content, the watermark signal element is either not applied, or it can be asserted as a texture, using colors and spatial resolution that make it difficult to discern. As such, for every location in the watermark signal mapping, there is an opportunity for watermark modulation.

As noted in more examples below, the watermark signal need not be mapped to a uniform array of blocks. One alternative is use feature points in the image to form a spatial reference for insertion of a data signal.

The watermark signal can be comprised of a single data component, or more than one component, as detailed in U.S. Pat. No. 6,614,914. One component is a direct sequence spread spectrum modulated data signal. This component is generated by applying error correction coding (convolutional coding) to a data signal, which produces an error correction coded data signal. This signal is than modulated onto pseudorandom carrier signals to produce a spread spectrum modulated signal, which is then mapped to locations in a tile. This is one example of watermark signal generation, and there are many others.

Above, a method of inserting a watermark signal by varying the print structure within the RIP to modulate the watermark into an image is illustrated. A specific example is given for varying the density and direction or angle of print primitives (e.g., line structures or dots) used to print a particular color in an image having a uniform tone. A data signal pattern may also be introduced by varying the halftone screen type for different regions of an image. Print structures can vary among a set of screening types, including noise like (e.g., stochastic screens) and structured (clustered dot, line screens, etc.). This approach is not limited to watermark modulation of images with uniform tones, as it applies to inserting watermarks into various types of image content.

Some embodiment examples—include the following:

a) Choose the angle in colorspace of watermark signal modulation (e.g., in the ab plane of Lab colorspace) to be different at different regions throughout the image. In one class of digital watermark embodiments, these regions correspond to watermark signal elements, and an arrangement of the regions forms a spatial watermark signal pattern of watermark signal elements. Data may be modulated into the pattern using spread spectrum modulation as noted above, or other data modulation schemes. The arrangement, orientation and shape of these regions may be designed to convey alternative data code signals. Multiple data signals may be interleaved for different spatial locations, as well as different directions in color space.

b) Choose the spatial frequency of watermark signal modulation to be different at different regions throughout the image. Similar data insertion as mentioned for section a) also applies to this section b).

c) Use the edges of the image content to define a signal along the edges in an imperceptible set of dimensions (color & spatial frequency). In this case, the edges detected in the image are used as a reference for the watermark signal. Thus, rather than being arranged in a pre-determined array of blocks or regions, the watermark signal is inserted along the direction of the edge. Along this edge, the watermark signal can have a regular pattern or structure to facilitate detection. The watermark signal is detected by first finding the edges and then detecting the watermark signal relative to these edges (e.g., by correlating the image signal with the regular pattern of the data signal).

d) Use the edges of the content to define a signal perpendicular to the edges in an imperceptible set of dimensions (color & spatial frequency). As in the previous example, the edges provide a reference orientation and location of the watermark signal.

e) Use higher dimensional shapes/patterns of color and spatial variations where pixels separated spatially may still be close in either spatial or color patterns. This reduces sensitivity to geometric distortions.

In some embodiments, those higher frequency spatial/color variations are designed to take advantage of lower resolution devices to generate shifts in image characteristics that can be measured. The data signal elements are inserted to exploit the Bayer pattern of RGB sensors to enhance a desired data signal that would otherwise be imperceptible. These signal elements are designed to induce distortion (e.g., aliasing, or a color shift) in the image captured through the sensor of the printed object. This distortion at the data signal locations enhances the pattern because the shift in signal characteristics at these locations increases the data signal at these locations relative to surrounding image content and noise. For example, aliasing caused by capturing a high frequency screen region with a lower frequency sensor creates a detectable data signal element at that region.

A similar effect can also be achieved by modulating ink height using a printer that is capable of controlling the height of ink deposited at a particular location. These printers enable control over height of ink by building up ink at a particular print location. This is useful for authentication or copy protection applications.

The height of the structure can be used to carry information by viewing at an angle with a device such as a fixed focus (or Lytro) camera.

The height variations can also be designed to cause color changes that are used to carry information. When the print is viewed normally, these height variations would be imperceptible if the pigment is opaque. This information can be watermark, barcode or any other signaling mechanism.

The above methods apply to variety of print primitives, and are not limited to particular line screens or clustered dot structures. With control over the RIP, the shape, spatial frequency, and orientation of structures can be specifically designed to exploit sensor geometries and Modulation Transfer Function (MTF) characteristics to cause discrimination between local regions of an image. For example, small lines slanted left and right at different spatial frequencies. Or solid dots vs. tiny dot clusters which contain the same ink density on physical object, but differ in color after acquisition through a class of image sensors (such as those sensors widely used in smartphone cameras). Some regions may use a form of noise like dot pattern (e.g., stochastic screening), while others use a shape with particular structure, like a clustered dot or line screen. The dot gain varies with number of edges (perimeter) of the print structures, so the amount of dot gain correction is also adapted based on the print structure. For example, in the example above where some regions are printed with high frequency line structures and others with lower frequency, the line widths in the high frequency structure have to be reduced more than the line widths in the lower frequency structure to compensate for dot gain.

Another approach that can be implemented within the RIP is to transform the image into a form for printing so that it has carefully controlled noise characteristics. The noise characteristics can be set globally across an image to indicate the presence of a watermark. The noise itself can comprise digital data, such as a spread spectrum modulated data signal. Alternatively, the RIP can generate an image with a pattern of regions that are detectable based on distinguishable noise characteristics. The arrangement of this pattern can be used as a reference signal to provide the location and orientation of a watermark signal inserted in the image.

The watermark may also be conveyed using a reversible image transform or detailed image characterization by manipulating the image through either transform coefficients or through local noise manipulations in a detectable yet imperceptible way. One form of reversible transform is the grayscale medial axis transform applied separately to the color directions. See, in particular, Image approximation from gray scale 'medial axes' by Wang, S.; Wu, A. Y.; Rosenfeld, A., in IEEE Transactions on Pattern Analysis and Machine Intelligence, vol. PAMI-3, November 1981, p. 687-696.

A stochastic modeling approach that allows for detectable manipulations is the Markov Random Field (MRF) model that can be used to define local pixel relationships that convey watermark signal data elements. The MRF manipulation is particularly interesting because it can be designed to have particular noise properties that might be exploited at the detector. See, How to generate realistic images using gated MRF's Marc' Aurelio Ranzato Volodymyr Mnih Geoffrey E. Hinton, Department of Computer Science, University of Toronto SIFT Description SIFT is an acronym for Scale-Invariant Feature Transform, a computer vision technology developed by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by a set of SIFT features is also robust to partial occlusion; as few as 3 SIFT features from an object can be enough to compute location and pose.

The technique starts by identifying local image features—termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient are calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints are different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25%—to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure, suitable for implementation in a next generation cell phone, is Bonato et al, "Parallel Hardware Architecture for Scale and Rotation Invariant Feature Detection," IEEE Trans on Circuits and Systems for Video Tech, Vol. 18, No. 12, 2008.

An alternative hardware architecture for executing SIFT techniques is detailed in Se et al, "Vision Based Modeling and Localization for Planetary Exploration Rovers," Proc. of Int. Astronautical Congress (IAC), October, 2004.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

Watermarking and Fingerprinting System Configurations

FIG. 1 is a block diagram illustrating the creation of a content recognition system using fingerprints and watermarks. The digitized input image/video/audio signals 100 are input to the fingerprint calculator/watermark embedder 102, which computes multiple fingerprints for each content item to be uniquely recognized, and also watermarks the content item. In a database entry process 102, the fingerprints are entered and stored in a database, along with additional information, such as metadata for the content item, a digital master copy for use as needed (see Patent Application Publication 20100322469 for description of techniques involving use of original content in watermark detection and determining location within content). A database organization process 106 in a database system sorts and arranges the fingerprints in a data structure, such as a tree structure to enable fast searching and matching. This database itself may be distributed over an array of computers in an identification network (108). This network receives queries to identify or recognize content items based on a stream of fingerprints and/or watermarks from a requesting device, such as a user's handheld mobile device or other computing device (node in a network of monitoring devices).

Figure 2:
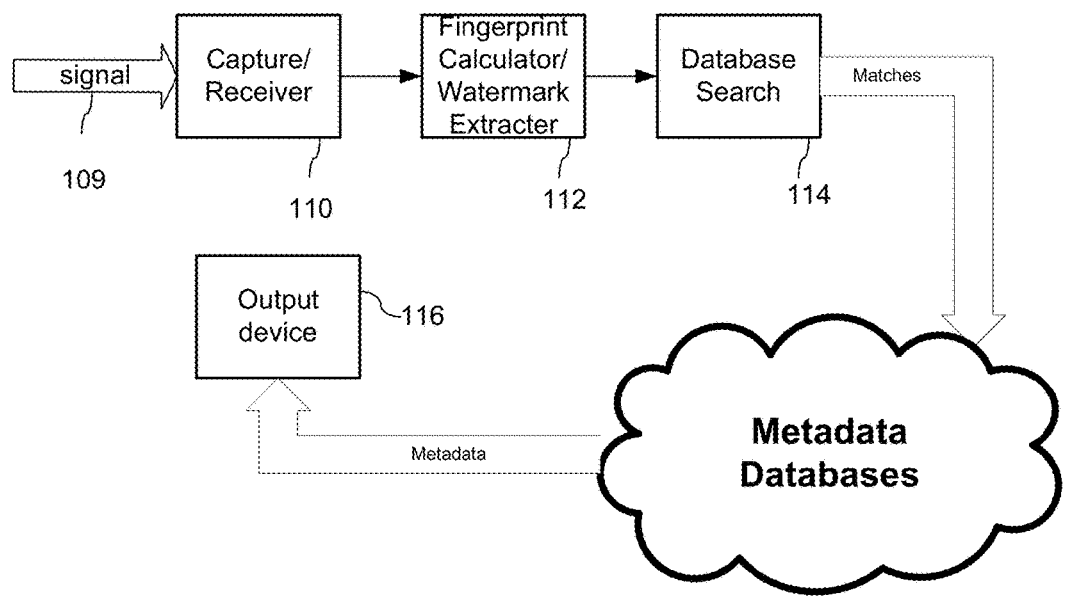
FIG. 2 is a block diagram illustrating the content identification process.

FIG. 2 is a block diagram illustrating the content identification process. Incoming signals 109 are captured in a receiver 110. This includes still or video image capture in which images are captured and digitized with an image sensor like a camera or other image capture device, as well as ambient audio capture by microphone. It also includes receipt of audio, image or video content in a broadcast or transmission channel, including broadcast stream or file transfer. The recognition process may be invoked as part of a systematic Internet monitoring or broadcast monitoring of content signals, in home audience measurement, batch database searching and content indexing, or user requests for content recognition and metadata searching. The fingerprint calculator/watermark extracter 112 computes fingerprints and/or watermarks for incoming content items and issues them to a database for database search for matching fingerprints and data look up for watermark based identifiers 114. The fingerprint matches found in the search process and watermark identifiers provide content identification (a number or some other form of index for metadata lookup), which in turn, enables look up of metadata corresponding to the content identification in one or more metadata databases. The metadata is then returned to device 116 for display/output or further processing. This may involve returning metadata to a device that requested the database search or some other device to which the search results are directed (e.g., a user's home device, or a monitoring system's data collection database in which the metadata and recognition events are aggregated and compiled for electronic report generation).

AR Exploitation

Sometimes watermark detection needs properly aligned image data to establish a proper registration for reliable payload recovery. Suitable image alignment is difficult to achieve in many mobile environments. For example, and with reference to FIG. 4, a smartphone captures imagery of a subject surface (e.g., a magazine, newspaper, object, etc.). The pose relative to the smartphone's video camera and the subject surface (sometimes referred to as "image pose") changes as a user positions the phone to capture video. In this context, pose can include perspective angle, scale, rotation and translation.

I have developed methods and systems to accurately estimate geometry capture distortion and modify imagery prior to watermark detection. This can be used in connection with augmented reality overlays to provide rich user experiences. But it all starts with determining the correct relative pose.

Figure 5:
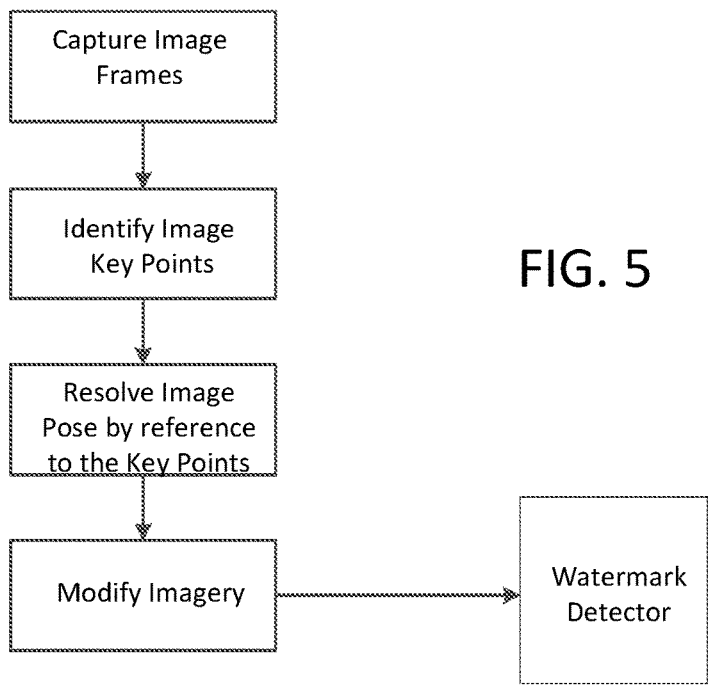
FIG. 5 is a block diagram of resolving pose information from captured imagery.

As an initial overview, and with reference to FIG. 5, captured image frames are analyzed to identify key points. These key points can be tracked over time to resolve relative image geometry including pose. The captured imagery can be modified according to the resolved geometry to remove any distortion introduced by relative camera positioning including, e.g., removing rotation, perspective angle, scale, etc. The watermark detector can analyze the modified, captured imagery in search of a previously hidden digital watermark.

Our methods can be implemented by many suitable electronic devices. One example is a portable device including a video camera, e.g., such as a smartphone, tablet, pad, etc. With reference to FIG. 6, software (e.g., a smartphone App) is enabled on the portable device. (One example of the software may include a modified version of Digimarc's Digimarc Discover application. From Digimarc's website: "Digimarc Discover uses multiple content identification technologies—digital watermarking, audio fingerprinting and QR code and barcode detection—to give smartphones the ability to see, hear and engage with all forms of media. Consumers simply launch the Digimarc Discover app and point their phone at the content of interest—an ad, article, package, retail sign, etc.—and are instantly connected to a menu of optional experiences such as learn more, view a video, launch an app, map directions, share via social media, save for later or make a purchase.")

Image data, e.g., video frames captured by the device's video camera is gathered and provided to a pose detector or detection process to determine pose of the camera relative to a depicted subject surface. Captured imagery can be modified to remove any distortion, e.g., scale, perspective, translation, rotation. The modified imagery is analyzed for hidden digital watermarking. Once detected, the digital watermarking can serve as a backbone for an augmented reality (AR) experience. For example, the watermarking may include a link to obtain video. The video can be overlaid in a device display area. In some cases, the video can be overlaid in image display area spatially corresponding to the subject surface's that includes digital watermarking (FIG. 7). Updated pose information can be provided to ensure that the overlaid graphics or video continue to be positioned where intended, e.g., the video can continue to be played in the intended spatial area, even as the camera moves relative to the object's surface.

Positioning and tracking of overlay graphics and video can be enhanced e.g., by tracking and mapping image frames or features with the image frames. For example, a keyframe-based SLAM system as discussed in Klein, et al., "Parallel Tracking and Mapping on a camera phone," Mixed and Augmented Reality, ISMAR 2009, 8th IEEE International Symposium on 19-22 Oct. 2009, which is hereby incorporated by reference in its entirety, could be used. Other tracking such as natural feature tracking or marker-based systems, etc. could be used as well for the position and tracking of overlay graphics, video and other AR features.

But let's go back and even further discuss pose detection.

Imagery (video) frames are captured with a device sensor, e.g., a camera. A first image frame $I_1$ is analyzed to detect "key points". A key point generally represents a robust image characteristic. Some examples of key points include, e.g., a feature corner or other characteristic, an area having one or more (locally) large non-zero derivatives, etc. Other features as discussed above under the SIFT section can be used as well. Homography matrices can be constructed representing key points from $I_1$ relative to another image frame $I_2$. (Of course, it is not necessary for frames $I_1$ and $I_2$ to be adjacently located frames. In fact, there is some benefit for frames to have some sufficient distance between them to have a representable difference in rotation, scale, translation, perspective, etc. Additionally, homography can be estimated from an image pair itself (e.g., two images), instead of from two (2) or more sets of corresponding key-points.) For example, the EMS homography described in Benhimane et al, "Homography-based 2d visual tracking and servoing," The International Journal of Robotics Research, Vol. 26, No. 7, pages 661-676, July 2007, could be used to represent a transform between key points in different image frames. The Benhimane paper is hereby incorporated herein by reference in its entirety. In noisy imagery, we've found that 20-60 key points are sufficient. Of course, more or less key points could be used with varying degrees of success.

Multiple pose Homographies can be constructed, e.g., between $I_1$ and $I_2$, $I_2$ and $I_3$, $I_3$ and $I_4$, and so on. Given at least four (4) views (e.g., frames) of the subject surface, and corresponding pose Homographies between the frames, a cost function can be utilized to find pose information that best fits a current frame. I prefer to use between 4-10 homographies with a cost function; however, additional homographies may be used as well. The techniques (including the cost function in section 2.2.1) described in Pirchheim, et al., "Homography-Based Planar Mapping and Tracking for Mobile Phones," could be used to find such pose information. The Pirchheim paper is hereby incorporated herein by reference in its entirety. The Homography that minimizes the cost function can be used to provide pose information.

Pirchheim's Section 2.2.1 states:

"2.2.1 Cost Function and Parameterization

In the following we describe the mathematical formulation of the optimization scheme given in [A. Ruiz, P. E. L. de Teruel, and L. Fernandez. Practical planar metric rectification. In Proc. BMVC 2006, 2006] for completeness. We define the scene plane to be located in the canonical position z=0 corresponding to the (x;y) plane. Thus, points on the plane have a z-coordinate equal zero and can be written as (x;y;0;1) in homogeneous coordinates.

The unknowns in the optimization are the camera poses Pi relative to this plane. Under the assumption that all world points are located on the plane, camera poses can easily be re-formulated as 2D homographies by eliminating the third column of the pose matrix Pi:

$$\begin{pmatrix} u \\ v \\ 1 \end{pmatrix} \sim (R \mid t) \begin{pmatrix} x \\ y \\ 0 \\ 1 \end{pmatrix} = (r_1 \mid r_2 \mid t) \begin{pmatrix} x \\ y \\ 1 \end{pmatrix}, \tag{1}$$

The resulting pose homographies have the following important property based on the observation that their first and second columns are ortho-normal vectors, where $r_1$ and $r_2$ are the first and second column of R respectively:

$$C^T \cdot C = \begin{pmatrix} r_1^T \\ r_2^T \\ t^T \end{pmatrix} (r_1 \mid r_2 \mid t) = \begin{pmatrix} 1 & 0 & \dots \\ 0 & 1 & \dots \\ \dots & \dots & \dots \end{pmatrix} \tag{2}$$

Additionally, given a pose homography $C_1$ and the homography $H_{2;1}$ mapping from camera $C_1$ to $C_2$, the corresponding pose homography $C_2$ can be computed as follows:

$$C_2 = H_{2,1} \cdot C_1. \tag{3}$$

$C_1$ must observe the constraint (2). Moreover, by substituting (3) into (2) we obtain the following additional constraint for $C_1$:

$$C_2^T \cdot C_2 = (C_1^T H_{21}^T) \cdot (H_{21} C_1) = \begin{pmatrix} 1 & 0 & \dots \\ 0 & 1 & \dots \\ \dots & \dots & \dots \end{pmatrix}. \tag{4}$$

We can formulate the constraint as a cost function on $C_1$ by enforcing that the off-diagonal entries are 0 and the diagonal entries have the same value. Thus, we define the following cost function for one homography $H_{i;1}$:

$$(H_{i,1} C_1)^T (H_{i,1} C_1) = \begin{pmatrix} a_{1,1} & a_{1,2} & \dots \\ a_{1,2} & a_{2,2} & \dots \\ \dots & \dots & \dots \end{pmatrix}, \tag{5}$$

$$e_i(C_1) = (a_{1,2}/a_{1,1})^2 + (a_{2,2}/a_{1,1} - 1)^2. \tag{6}$$

The resulting cost function (6) exploits well-known orthogonality constraints over the image of the absolute conic [R. I. Hartley and A. Zisserman. Multiple View Geometry in Computer Vision. Cambridge University Press, second edition, 2004] and holds for any homography $H_{i;1}$ mapping from the reference camera to another camera i. For a set of cameras $C_i$, all connected with individual homographies Ho to a reference camera $C_1$, we construct a cost function by adding up individual costs, obtaining a single cost function for the unknown reference camera pose $C_1$ $$e(C_1) = \sum_i e_i(C_1). \qquad (7)$$

Figure 4:
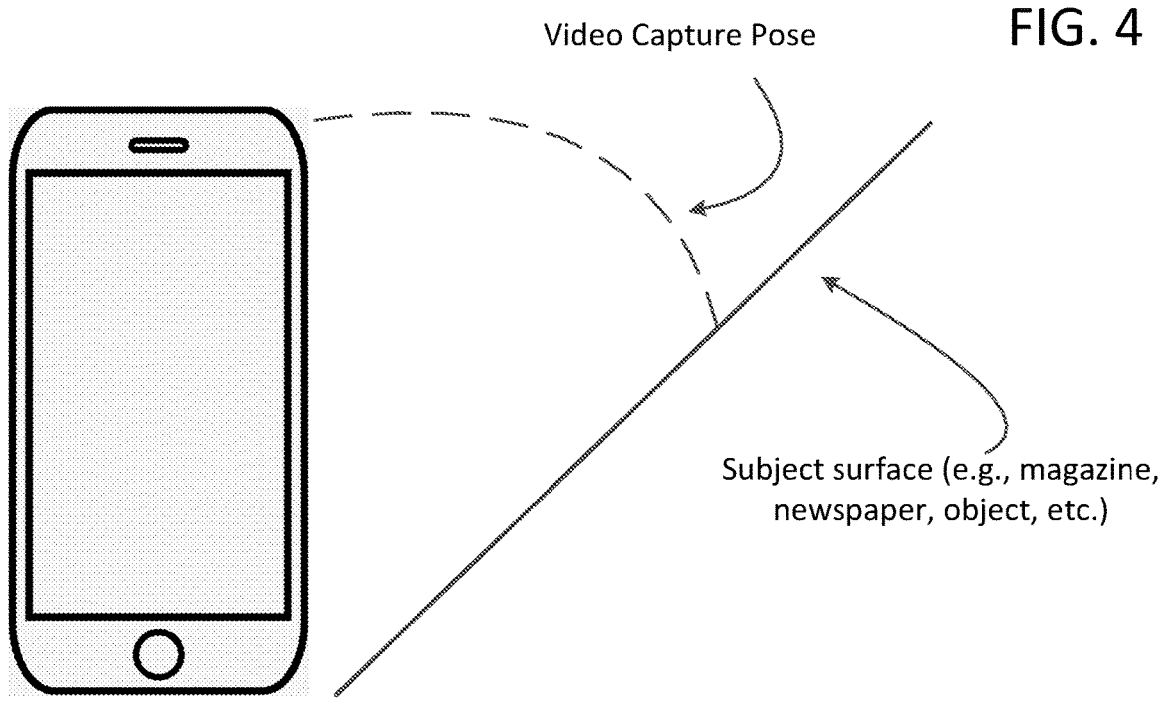
FIG. 4 is a diagram showing image capture of a subject surface.

Overall, the whole problem of estimating all camera poses Ci can be reduced to finding one camera pose C1 that minimizes the total cost function (7). A homography $H_{2;1}$ between two cameras has 8 degrees of freedom because it is defined up to scale. By fixing the unknown plane and allowing the second camera $C_2$ to move freely, the first camera C1 has only 2 degrees of freedom left. Ruiz et al. [ . . . ] propose to fix the camera position and vary the camera tilt (x-axis) and roll (z-axis) angles but remain vague concerning the valid 2DOF parameter range. Geometrically, we interpret the parameterization as depicted in FIG. 4. Plane and reference camera are defined to be located in canonical position, the plane aligning with the world (x;y) plane and the reference camera located at position (0;0;−1) such that world and camera coordinate systems align. We assume that the plane rotates and the camera stays fixed. The first rotation around the x-axis lets the plane move along a circle aligned with the (y,z) camera plane. The second rotation lets the plane move along another circle aligned with the (x;y) camera plane. Avoiding the plane to be rotated behind the camera, we define (−π/2;π/2) as range for the x-rotation parameter. For the z-rotation parameter we define [−π/2, π/2) as the valid range to avoid solution symmetry."

The above mentioned papers: i) A. Ruiz, P. E. L. de Teruel, and L. Fernandez. Practical planar metric rectification, In Proc. BMVC 2006, 2006, and ii) R. I. Hartley and A. Zisserman, Multiple View Geometry in Computer Vision, Cambridge University Press, second edition, 2004, are each hereby incorporated herein by reference in their entireties.

There are many refinements. For example, different homographies can be created for different pose parameters, e.g., separate out image translation or group together scale and rotation, etc. Also, a first pose estimate can be provided based on one or more pose parameters, and then refine the estimate by using additional parameters.

Captured image data can be modified to remove or modify distortion based on the pose information. Watermark detection can be carried out on the modified imagery.

The pose information need not be perfect, but provides pose information that preferably gets the pose detection in the ball park for watermark detection. For example, the digital watermarking detection currently used in the Digimarc Discover application currently can produce reads with a perspective angle of up to ±30-35%.

Successful watermark detection can launch an AR experience as discussed above. A watermark payload bit (or bits) can also be used to trigger an announcement to a user that an AR overlay is about to launch and/or offer, e.g., the user a chance to cancel or proceed with the AR experience.

The pose detector can continue to detect pose information (e.g., based on minimizing a cost function associated with pose Homographies) from captured imagery long after a watermark has been detected. This may provide the AR system with continuing pose information as the AR experience continues. This continuing pose information can be provided to the AR system to help determine relative positioning of any overlay graphics relative to captured imagery.

A potentially more accurate approach is to provide baseline orientation information from digital watermark detection. For example, successful watermark detection may also provide image orientation information. Indeed, digital watermarking many include orientation attributes (see, e.g., U.S. Pat. Nos. 8,243,980; 7,116,781 and 6,614,914; which are each hereby incorporated herein by reference in its entirety) that are helpful to identify the original rotation, scale and translation of the imagery when the watermark was inserted. This base-line orientation information can be used by an AR system, e.g., for transforming captured imagery for display on a device screen to accommodate for relative capture device pose. (Watermark orientation information can also be used to update or reset pose information being calculated by a Pose Detector.)

Watermark information can be used to modify or remove unwanted rotation, scaling or translation, essentially restoring the image to the state in which it was watermarked. This restored image content allows for reliable digital fingerprint analysis. Consider the possibilities.

Figure 8:
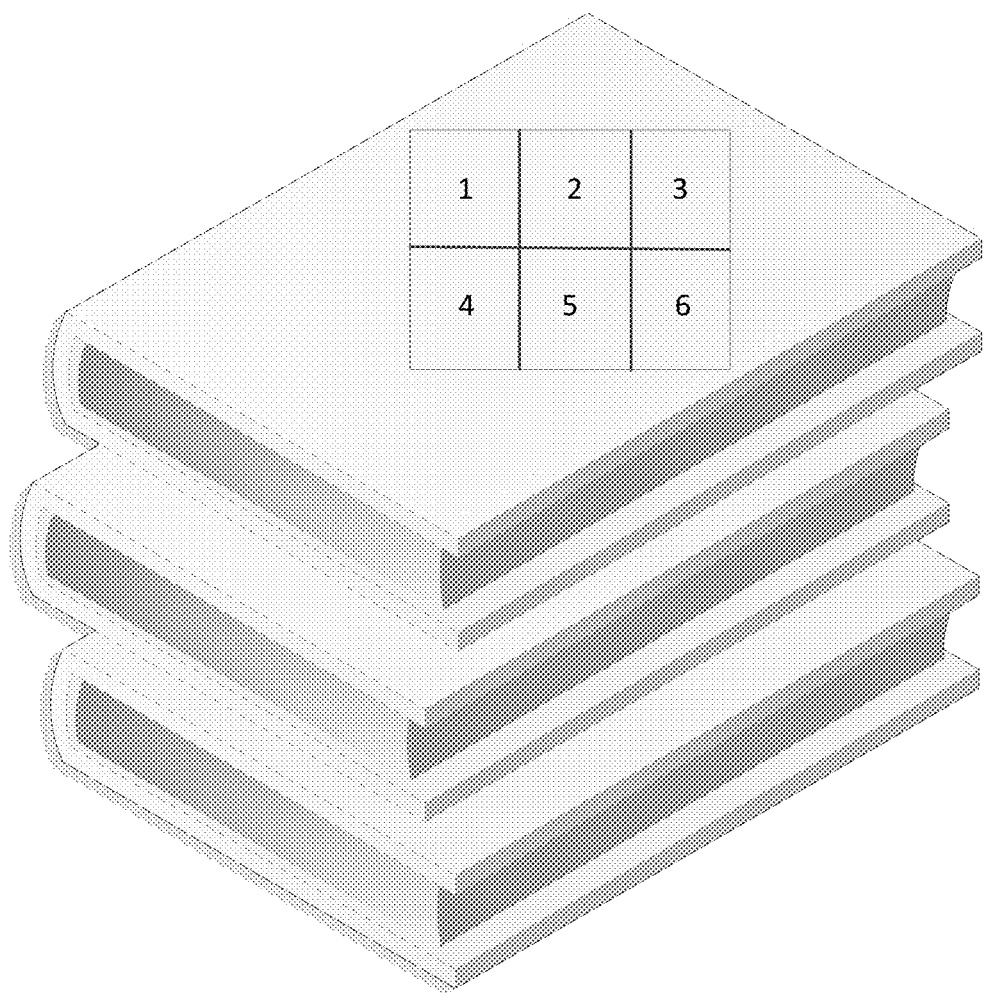
FIG. 8 shows a subject area including a watermarked area having different watermarked areas.

Having access to the original image when embedding watermarking, a watermark embedder can analyze image areas and based, e.g., on color, luminance, texture and/or coefficient information, can calculate a fingerprint of the area. For example, and with reference to FIG. 8, areas 1-6 are separately fingerprinted. This information can be stored in association with a digital watermark that is embedded in the areas.

A watermark detector later encounters imagery depicting areas 1-6. If the watermark is redundantly encoded in areas 1-6 (e.g., the same watermark is placed in each area), the detector might have trouble determining whether it detected the watermark from area 3 vs. area 1 vs. area 4, and so on. This may matter if a different AR experience is intended for different areas on the subject's surface.

Since the imagery is restored to its original or near original form, the watermark detector, or a unit cooperating with the watermark detector, may compute a corresponding digital fingerprint of the detection area. This can be compared to the original fingerprint (created at embedding) to determine the location of the watermark detection area, e.g., does the fingerprint correspond to areas 1 or 3 or 4. In one example the fingerprint calculation process uses coefficients of a linear projection. When a watermark is read, the watermark detector (or software/device) cooperating with the detector, may communicate the watermark payload to a registry. This registry may include the original fingerprint information that the detector can use to determine the digital watermark read location. Knowing the location of a detection block can be important in some applications where the spatial position of the watermark on a surface is used by an AR system (e.g., overlaying video only over certain areas of a photograph that contains multiple watermark areas or blocks).

The area or block position alternatively can be included in a watermark payload. For example, an ID or other indicator may indicate the location, or relative location of the watermarked area.

System and Components

It is envisioned that the above processes, systems and system components can be implemented in a variety of computing environments and devices. It is specifically contemplated that the processes and components will be implemented within devices and across multiple devices. For example, signal capture, signature calculation and database entry and organization are performed on a set of devices to construct a recognition system, and signal capture, signature calculation and database search and retrieval are performed on another set of devices, which may be distinct or overlap.

The computing environments used to implement the processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, electronic processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices include, e.g., one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals includes transforming of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed during processing to compute signatures, including various data structure representations of the signatures as explained above. In turn, the data structure signals in memory are transformed for manipulation during searching, sorting, reading, writing and retrieval. The signals are also transformed for capture, transfer, storage, and output via display or audio transducer (e.g., speakers).

While reference has been made to mobile devices (like cell phones) and embedded systems, it will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones. (Details of an iPhone, including its touch interface, are provided in published patent application 20080174570, which is hereby incorporated herein by reference.)

Figure 3:
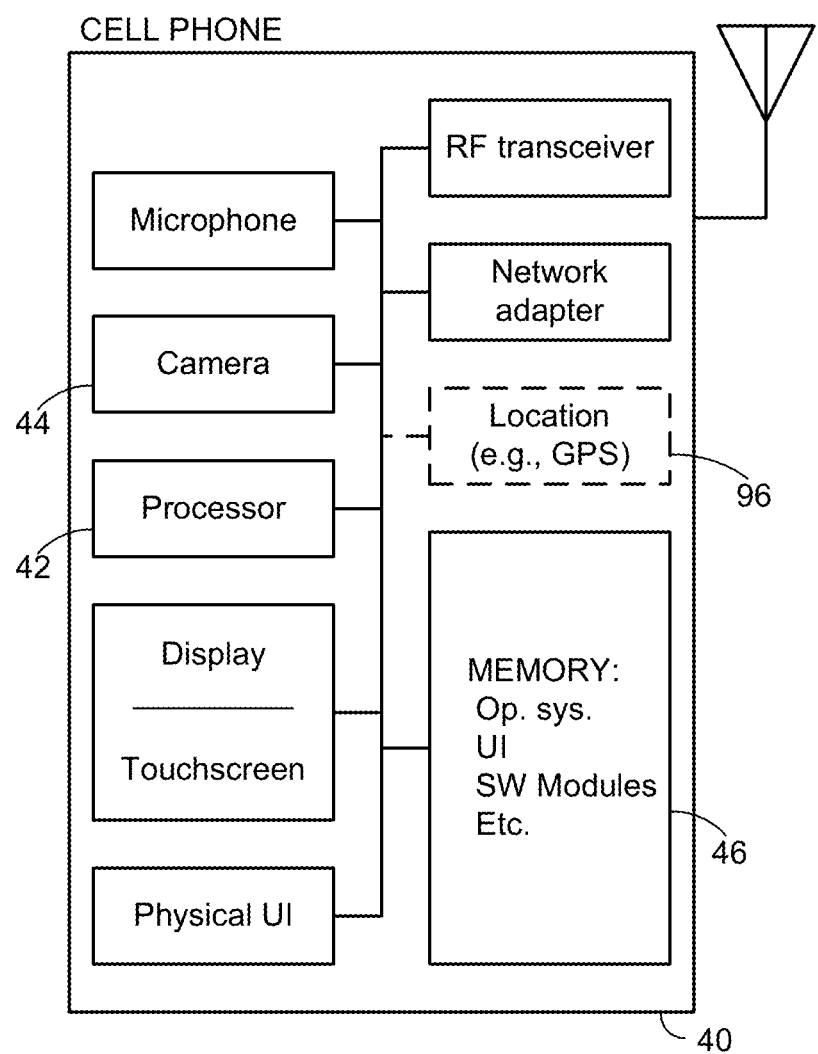
FIG. 3 is a diagram of a cell phone, which may be used in some content recognition systems.

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.). An exemplary cell phone that can be used to practice part or all of the detailed arrangements is shown in FIG. 3.

The processor can be a special purpose hardware device, or may be implemented by a programmable device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more digital signal processing cores, such as Texas Instruments TMS320 series devices.

Software instructions for implementing the detailed functionality can be readily authored by artisans, from the descriptions provided herein.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, extraction of signatures from a test image on a cell phone, and searching of a database for corresponding reference images on a remote server, is one architecture, but there are many others. For example, information about reference images may be stored on the cell phone—allowing the cell phone to capture a test image, generate signatures, and compare against stored signature data structures for reference images—all without reliance on externals devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.) In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above, in their entireties.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals (e.g., light waves in the visible spectrum) captured in image sensors. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

What is claimed is:

1. An image processing method of embedding a signal within imagery using raster image processing (RIP), comprising:
obtaining a plurality of elements representing a signal;
determining edges within the imagery;
using the determined edges as a reference, modulating a plurality of print structures within the RIP according to the plurality of elements to embed the signal within the imagery, in which one determined edge defines the signal to be at a predetermined angle in a set of dimensions comprising color and spatial frequency.

2. The image processing method of claim 1 in which the predetermined angle comprises a direction along the one determined edge.

3. The image processing method of claim 2 in which the plurality of elements comprises a regular pattern or structure to facilitate detection.

4. The image processing method of claim 1 in which the predetermined angle comprises a perpendicular direction of the one determined edge.

5. The image processing method of claim 1 in which the reference comprise spatial orientation information.

6. The image processing method of claim 1 further comprising:
detecting the signal from within the imagery, in which upon detection, the reference and the signal provide pose information relative to an optical capture.

7. The image processing method of claim 6 in which the pose information comprises an input to a homography generator.

8. An image processing method of embedding a signal within imagery using raster image processing (RIP), comprising:
obtaining a plurality of elements representing a signal, in which the plurality of elements correspond to different angles of signal modulation in a multi-dimensional colorspace at different regions throughout the imagery, in which the multi-dimensional colorspace comprises ab dimensions in an Lab colorspace;
modulating a plurality of print structures within the RIP according to the plurality of elements to embed the signal within the imagery.

9. The image processing method of claim 8 in which spatial frequency of signal modulation is different in the different regions.

10. A method comprising:
capturing imagery of printed material using optical capture, the printed material having printing thereon, the printing comprising artwork and a digital watermark signal embedded in the artwork, the digital watermark signal embedded in the artwork by obtaining a plurality of elements representing the signal, determining edges within the artwork, using the determined edges as a reference, modulating a plurality of print structures within raster image processing (RIP) according to the plurality of elements to embed the digital watermark signal within the artwork;
detecting the digital watermark signal from within the imagery;
determining the edges within of the artwork, the determined edges providing a reference;
utilizing the reference and the digital watermark signal to generate pose information relative to the optical capture; and
providing the pose information as an input to a homography generator.

* * * * *